United States Patent [19]

Lange

[11] Patent Number: 5,431,001

[45] Date of Patent: Jul. 11, 1995

[54] MECHANICAL RAKE FOR CLEARING, MOWING, LEVELLING, RAKING GRASSES AND PLANTS

[75] Inventor: André E. Lange, Ville sous Anjou, France

[73] Assignee: Les Forges des Margerides, Hauterives, France

[21] Appl. No.: 233,650

[22] Filed: Apr. 26, 1994

[30] Foreign Application Priority Data

Apr. 28, 1993 [FR] France ................ 93 05260

[51] Int. Cl.$^6$ .................. A01D 7/02; A01D 7/06; A01D 7/10; A01D 11/06
[52] U.S. Cl. .................. 56/400.07; 56/400.15; 56/400.21
[58] Field of Search .......... 56/400.01, 400.05, 400.07, 56/400.15, 400.16, 400.21, 164, 180, 257, 258, 259, 163

[56] References Cited

U.S. PATENT DOCUMENTS

| 1,381,569 | 6/1921 | Linhoff | 56/400.07 |
| 2,114,518 | 4/1938 | Bayliss | 56/400.07 |
| 2,208,880 | 7/1940 | Daggett | 56/400.07 |
| 4,696,348 | 9/1987 | Novoselsky | 56/400.01 X |
| 4,866,921 | 9/1989 | Nagashima et al. | 56/257 |
| 5,189,867 | 3/1993 | Schmidt | 56/257 X |

FOREIGN PATENT DOCUMENTS 2244197 11/1991 United Kingdom ............. 56/400.01

Primary Examiner—Stephen J. Novosad
Attorney, Agent, or Firm—Dowell & Dowell

[57] ABSTRACT

A rake having a handle at one end of which a housing is mounted containing a drive mechanism actuated by a motor. The drive mechanism reciprocates a cutting blade having a cutting plane parallel to the surface being worked and which blade includes a plurality of teeth directed in a direction for normal raking the surface being worked. A second fixed or movable cutting blade cooperates with the first cutting blade to form a plurality of parallel shears. Shoes are provided to support the first and second cutting blades at a height above the surface to be worked and collection elements may be mounted to the rake at the rear of the cutting blades for temporarily retaining cut waste.

20 Claims, 7 Drawing Sheets

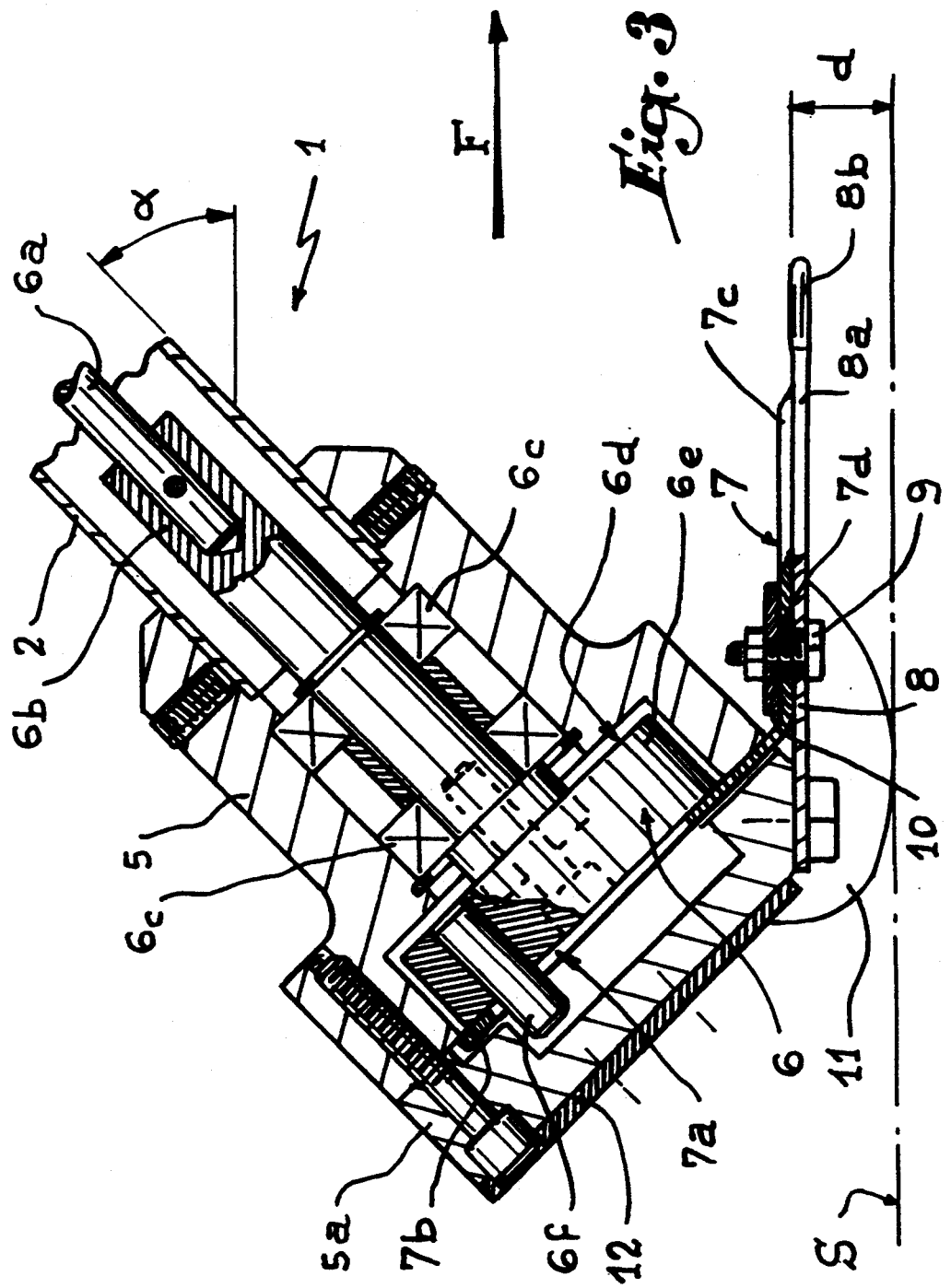

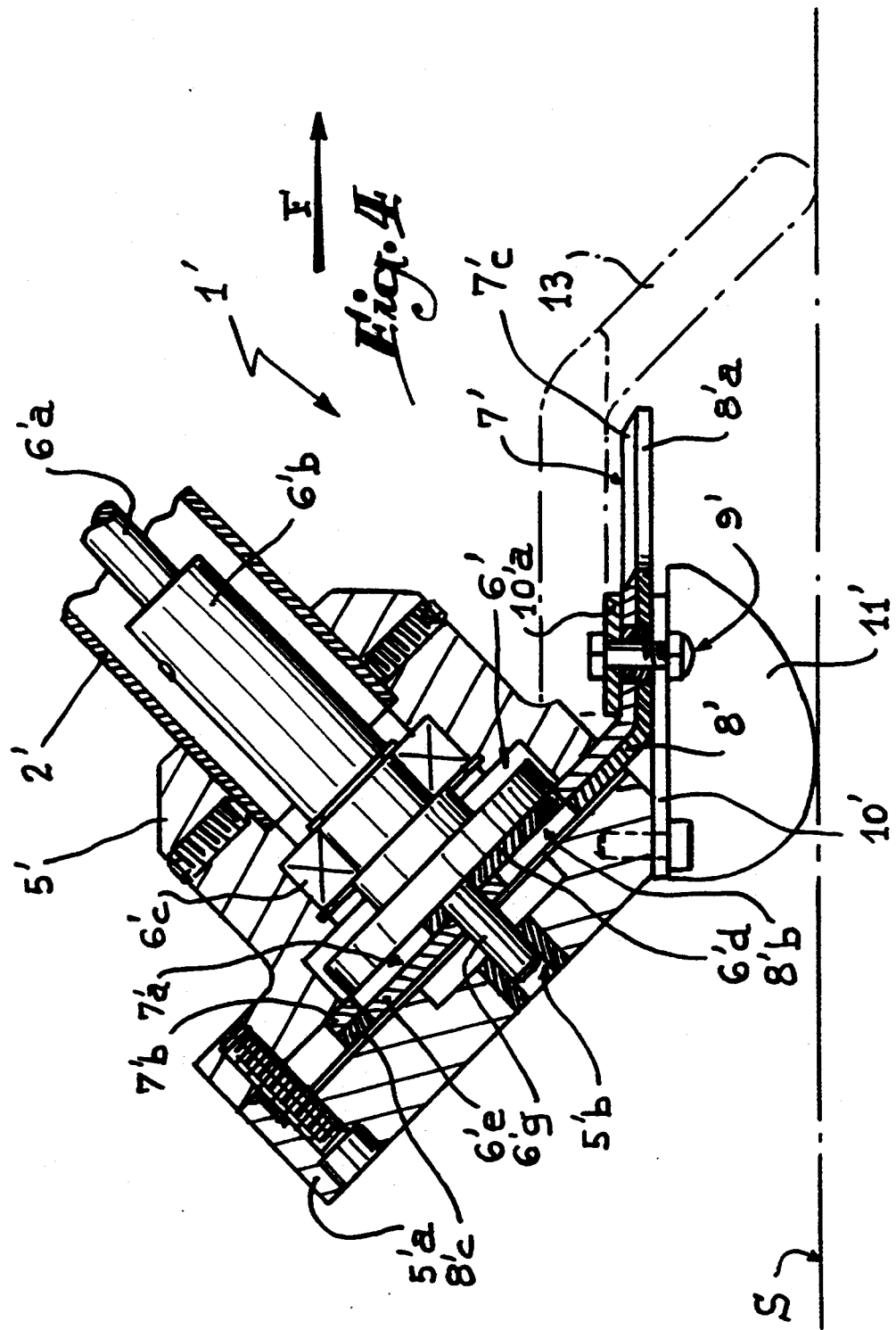

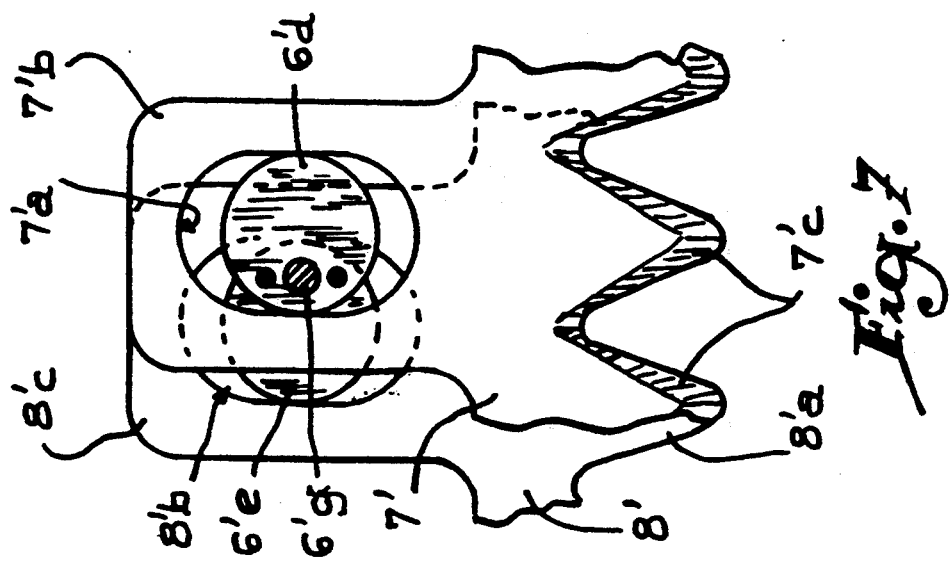
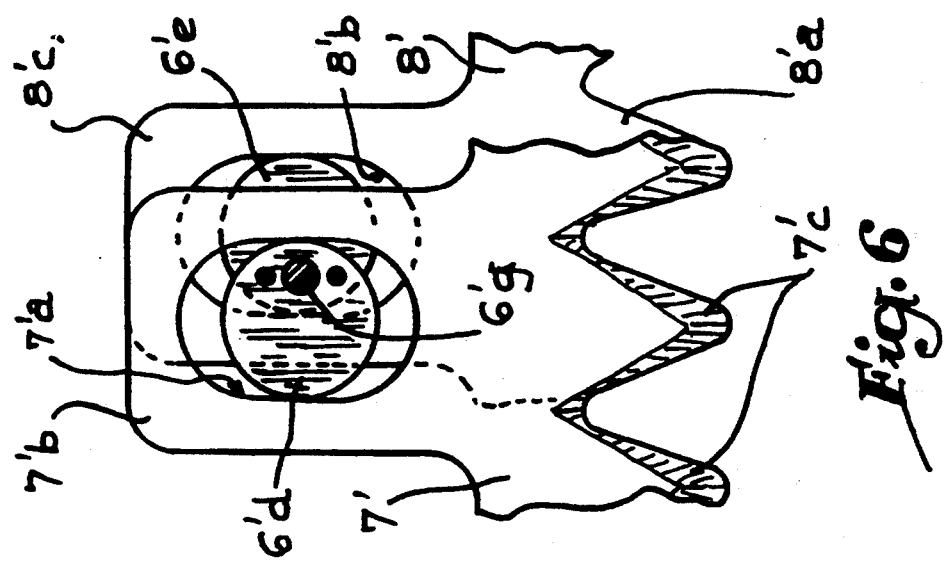
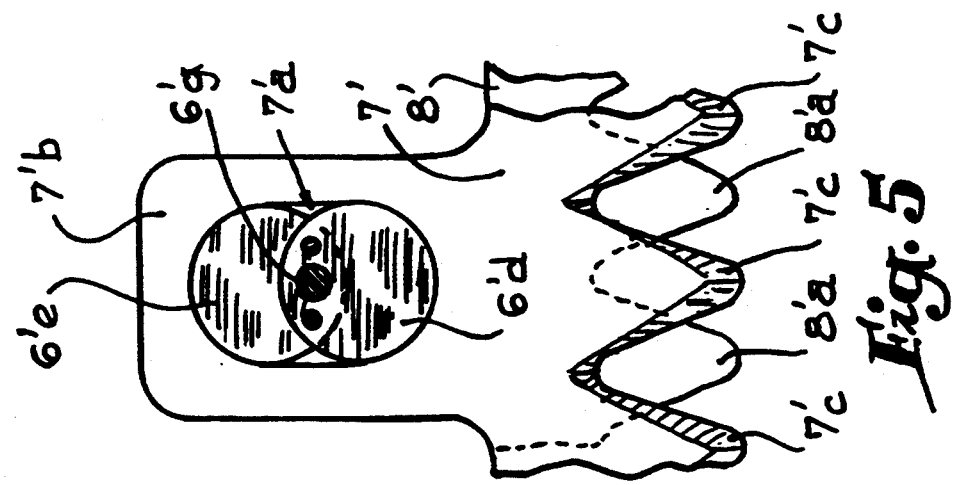

MECHANICAL RAKE FOR CLEARING, MOWING, LEVELLING, RAKING GRASSES AND PLANTS

BACKGROUND OF THE INVENTION

FIELD OF THE INVENTION

The present invention relates to a mechanical rake for clearing, mowing, levelling, raking grasses and various plants.

Grubbing, clearing, mowing, levelling of borders and raking are traditionally effected with the aid of tools such as undergrowth clearing machines, mowing machines, edge-cutters and rakes.

In the case of undergrowth clearing-grubbing, the apparatus used is a rotating steel blade moved with the aid of a motor. This apparatus is particularly dangerous for the user and for the people in the vicinity as the blade is totally concealed by cut plants and it may project earth, stones and plant twigs.

For mowing, the user employs a mowing machine with a rotating blade, on wheels or air-cushion, motorized or manual or with helicoidal blade. Mowing machines with rotating blades are provided to cut grass which is not too high as they have a low cutting height. Mowing machines are generally inefficient for cutting grass or other plants along walls, fences, trees or the like. Due to the position of the blade, there are also risks of accident to the user's feet. The blade causes stones, earth and twigs to be projected, which may reach the user or persons in the vicinity and insure them.

To level the borders and cut the grass between the bushes of a hedge, the user employs an edge-cutter or hand or motorized shears. The edge cutter generally comprises an electric motor which drives a nylon string, allowing the plants to be cut. This type of apparatus is very dangerous for the user, as blades of grass may easily be projected onto the user's face. In addition, the user must constantly extend the cutting string as the latter rapidly wears out upon contact with stones, walls, netting, etc..

All the apparatus described hereinabove are provided to cut, but do not make it possible to rake the plants at the same time.

It is a more particular object of the present invention to overcome these drawbacks.

SUMMARY OF THE INVENTION

The mechanical rake according to the invention has for its object to cut all sorts of plants and to rake them at the same time.

The mechanical rake comprises a handle secured at one end with a casing containing a drive mechanism actuated by an electric or thermal motor for the transverse and reciprocating displacement of a cutting blade of which the plane of cut is parallel to the ground and directed in the direction of raking. A second blade, fixed or mobile, cooperates with the first to constitute shears. Shoes are provided to determine the height of cut with respect to the ground, while collecting means are fixed to the rear of the cutting blades for temporary retention of the cut waste.

The rake also comprises protecting fingers on its second fixed cutting blade and in line with each tooth.

BRIEF DESCRIPTION OF THE DRAWINGS

The accompanying drawing, given by way of example, will enable the invention, the characteristics that it presents and the advantages that it is capable of procuring, to be more readily understood:

FIG. 3 is a section representing the position of the cutting blade with respect to the handle and to the ground.

FIG. 4 is a section similar to that of FIG. 3, but showing a second embodiment of the mechanical rake according to the invention.

FIGS. 5 to 7 are schematic views illustrating the displacement of the two mobile blades with respect to each other in the device shown in FIG. 4.

DESCRIPTION OF THE PREFERRED EMBODIMENTS

Figure 1:
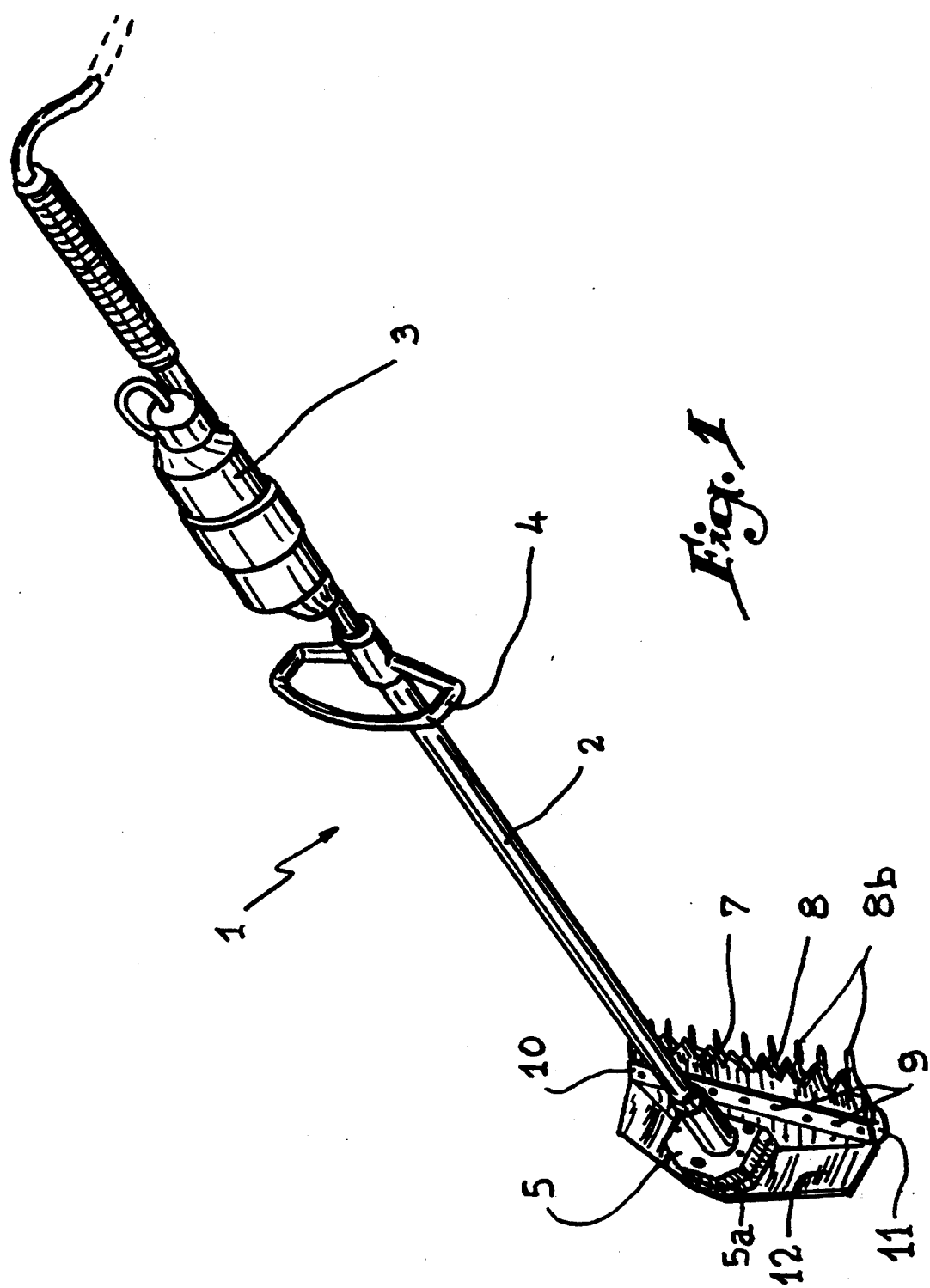
FIG. 1 is a view in perspective illustrating the mechanical rake according to the invention.
Figure 2:
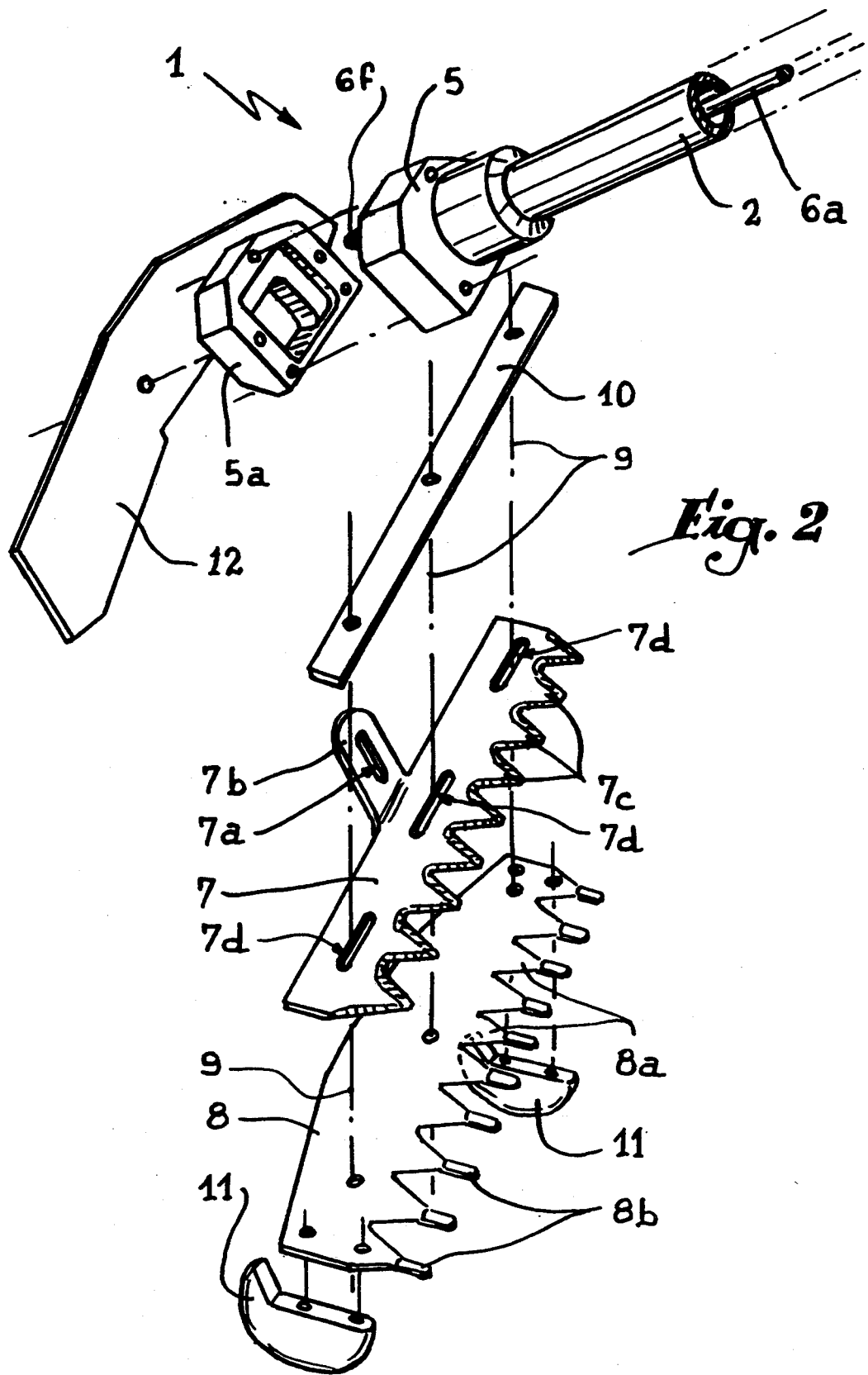
FIG. 2 is an assembly view in perspective showing the cutting blades of the mechanical rake.

FIGS. 1, 2 and 3 show a mechanical rake 1 comprising an advantageously hollow handle 2 or the like which supports, on the one hand, an electric or thermal motor 3 placed near a secondary handle 4 and, on the other hand, a control housing 5 which is secured to the lower end of handle 2.

The control housing 5 contains a drive mechanism 6 actuated by the motor 3 for the transverse and reciprocating displacement of a cutting blade 7.

The drive mechanism 6 is constituted by a drive shaft 6a, solid or hollow, rigid or flexible, telescopic or not (FIG. 3). The drive shaft 6a cooperates with the electric or thermal motor 3 to drive in coaxial rotation a sleeve 6b inside the housing 5. The sleeve 6b is axially guided via roller bearings 6c inside the housing 5. The sleeve 6b is secured to a balanced cam 6d which comprises, opposite its main body 6e, a pin 6f offset laterally with respect to the principal axis of the sleeve 6b.

The pin 6f cooperates with an oblong and vertical opening 7a made in a rear flange 7b of the cutting blade 7. The flange 7b is bent at an open angle so that the plane of cut of the blade 7, therefore that of the teeth 7c of the rake 1, is parallel to the ground S during use (FIG. 3).

The housing 5 is closed by a lid 5a which isolates the drive mechanism 6 so that the transformation of the rotating movement of the motor 3 into a movement of reciprocating translation is effected. On the lid 5a is fixed a second, straight cutting blade 8 which is disposed in the same parallel plane as that of the plane of cut of the first blade 7.

The second blade 8 is connected to the first 7 via screws and nuts 9 which cooperate with horizontal oblong holes 7d in order to guide the first blade 7 transversely with respect to the second 8.

Thus, the first blade 7 is tightened between the second 8 and a slide rod 10 allowing it to slide with a coefficient of friction which is as low as possible.

The second blade 8, which is fixed, comprises teeth 8a which form shears with the teeth 7c of the blade 7. Teeth 8a of the second blade 8 having forwarding extending projecting by fingers 8b of flattened, round or other profile. The fingers 8b protect the user during use of the rake 1 so that the shears formed by the teeth 7c and 8a of the blades 7 and 8 do not injure the user's feet, for example.

Below the blade 8 are fixed, in lid 5a, shoes 11, adjustable or not, of a predetermined height d allowing the rake 1 to slide over the ground S.

On lid 5a of the housing 5 and to the rear of the blades 7 and 8, there is screwed a deflector 12 making it possible to collect the grass or different plants previously cut.

FIGS. 4 to 7 show a second embodiment 1' of the mechanical rake 1 comprising a control housing 5' mounted to a hollow handle 2' or the like. The housing 5' contains a drive mechanism 6' which is actuated by a motor identical to that referenced 3 for the transverse and reciprocating displacement of two cutting blades 7' and 8'.

The drive mechanism 6' is constituted by a drive shaft 6'a identical to that, 6a, of rake 1. The shaft 6'a cooperates with the electric or thermal motor 3 to drive in coaxial rotation a sleeve 6'b inside the housing 5'.

The sleeve 6'b is guided axially via a roller bearing 6'c and a pin 6'g which cooperates with a hole 5'b made in the lid 5'a of the housing 5'.

The sleeve 6'b is secured to two cams 6'd, 6'e in disc form which are offset by 180° one with respect to the other and traversed by the guiding pin 6'g.

The cam 6'd cooperates with an oblong opening 7'a in the blade 7' while the second cam 6'e is placed inside an oblong opening 8'b in the blade 8'.

The openings 7'a and 8'a in blades 7' and 8' are respectively made in a flange 7'b and 8'c which is bent at an open angle so that the plane of cut of the blades, therefore of teeth 7'c and 8'a the rake 1' is parallel to the ground S during use (FIG. 4).

The movable blades 7' and 8' are guided with respect to each other via a lower rod 10' secured to with the lid 5'a and an upper rod 10'a by means of screws and nuts 9'.

Below rod 10" are fixed shoes 11', adjustable or not, of a predetermined height, allowing the rake 1' to slide over the ground S. Likewise on the lid 5'a of the housing 5' and to the rear of the blades 7' and 8', there may be screwed a deflector (not shown but identical to that, 12, of the rake 1) making it possible to collect the grass or different plants previously in the meadows (sic.).

In addition, the upper rod 10'a may be secured is a bent rake 13 whose teeth are located in front of the blades 7' and 8'.

FIGS. 5 to 7 show the reciprocating transverse displacements of the blades 7' and 8' with respect to each other by means of cams 6'd and 6'e. In fact, cams 6'd and 6'e are rotated in openings 7'a and 8'b, to drive the blades 7' and 8' in a transverse and reciprocating displacement.

It is noted that, when the cams 6'd and 6'e are located parallel to the longitudinal axis of the oblong openings 7'a and 8'b, the teeth 7'c and 8'a of the blades 7' and 8' are offset with respect to one another (FIG. 5).

On the contrary, when cams 6'd and 6'e are located perpendicular to the longitudinal axis of the oblong openings 7'a and 8'b, it is noted that the teeth 7'c and 8'a of the blades 7' and 8' are one above the other.

This position is identical when, for example, cam 6'd is located either to the left or to the right of the guiding pin 6'g (FIGS. 6, 7).

Figure 8:
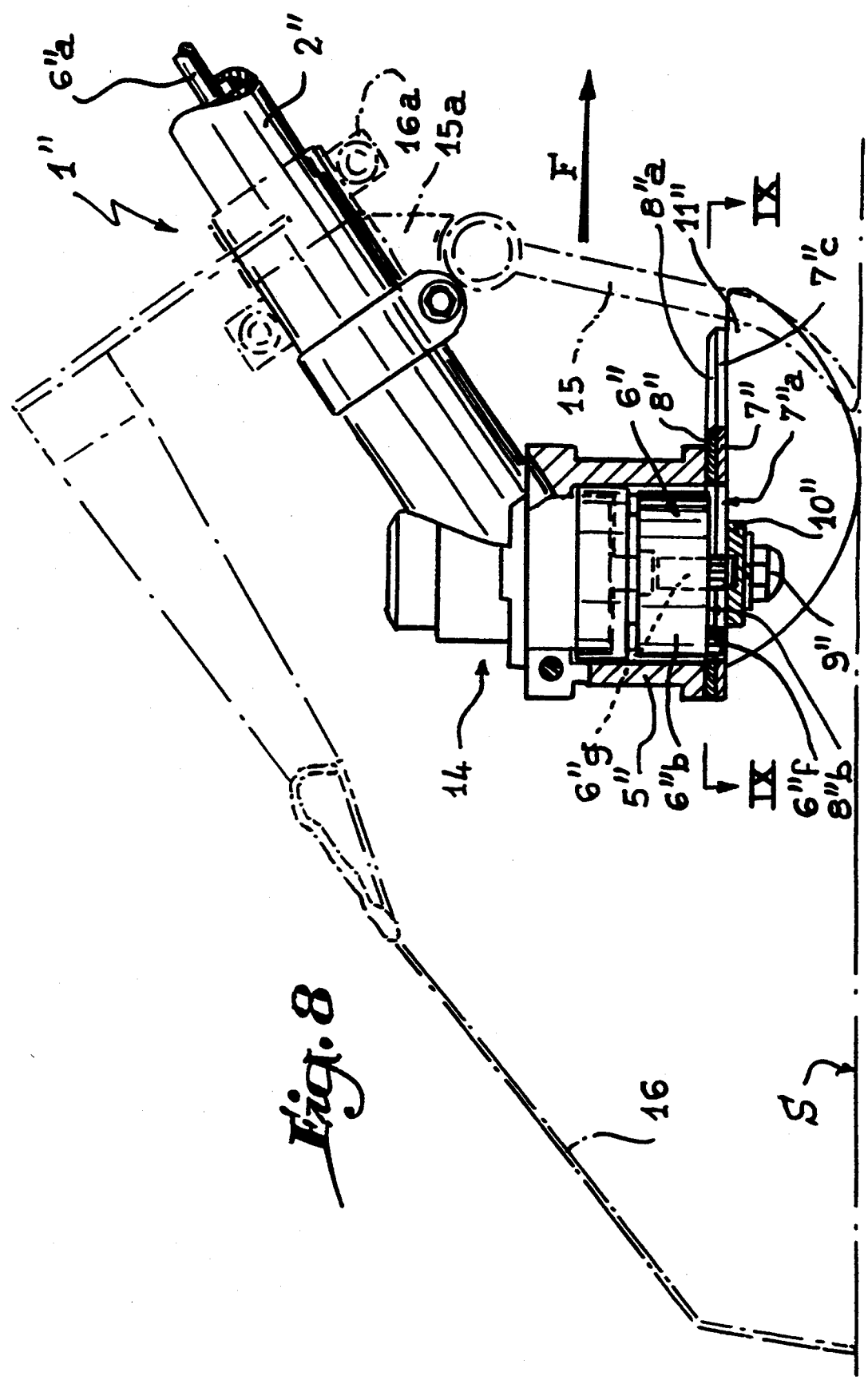
FIG. 8 is a section representing another embodiment of the mechanical rake according to the invention.

FIG. 8 shows a second and last variant of the mechanical rake 1 referenced 1" comprising a housing 5" secured to a hollow handle 2" identical to the one referenced 2. Housing 5" is fixed to the handle 2" via a bevel 14 of which its different pinions (not referenced) cooperate on the one hand with a drive shaft 6"a and on the other hand with a cam 6"b of a drive mechanism 6".

The drive shaft 6"a is identical to the one 6a and cooperates with an electric or thermal motor not shown but having the same characteristics as the one 3 shown in FIG. 1.

Cam 6"b is guided axially inside the housing 5" via a guiding pin 6"g.

Cam 6"b comprises a pin 6"f offset laterally with respect to the principal axis of said cam.

Pin 6"f cooperates with an oblong, vertical opening 7"a made in the body of a movable cutting blade 7".

Between the housing 5" and the blade. 7"1, there is provided a second fixed blade 8" which has an opening 8"b for the passage of the cam 6"b.

Blades 7" and 8" are disposed in a horizontal plane parallel to the ground S, while handle 2 is inclined by an angle α with respect to said blades.

The second blade 8" is connected to the first, 7", via screws and nuts 9" which cooperate with horizontal oblong holes (not referenced) in order to guide the first blade 7" transversely with respect to the second 8".

Between the screws and nuts 9" and the blade 7", there is provided a slide rod 10" for reducing the coefficient of friction between the blades.

Below the blade 7" are disposed shoes 11", adjustable or not, of a predetermined height allowing the rake 1" to slide over the ground S.

In front of teeth 7"c and 8"a of the blades 7" and 8", in the direction of cut F, there is provided a first rake 15. Rake 15 is articulated and fixed by a clamping ring 15a on the hollow handle 2" of the mechanical rake 1". In addition, a second rake 16 or lawn brush is fixed to the rear of the blades 7" and 8" in the direction of cut F. The brush 16 is fixed on the hollow handle 2" via a tightening ring 16a.

Figure 9:
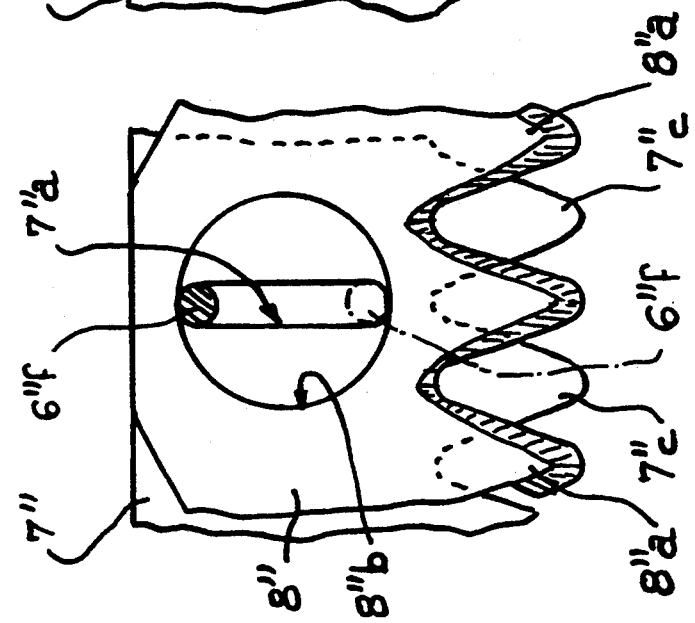

It is noted that the rotary movement of the cam 6"b secured to the pin 6"f makes it possible to drive in a transverse, reciprocating displacement the blade 7" in the same way as for rake 1. When pin 6"f is located in the vicinity of one of the ends of the oblong opening 7"a, it is ascertained that the teeth 7"c and 8"a of blades 7" and 8" are offset with respect to one another (FIG. 9).

Figure 11:
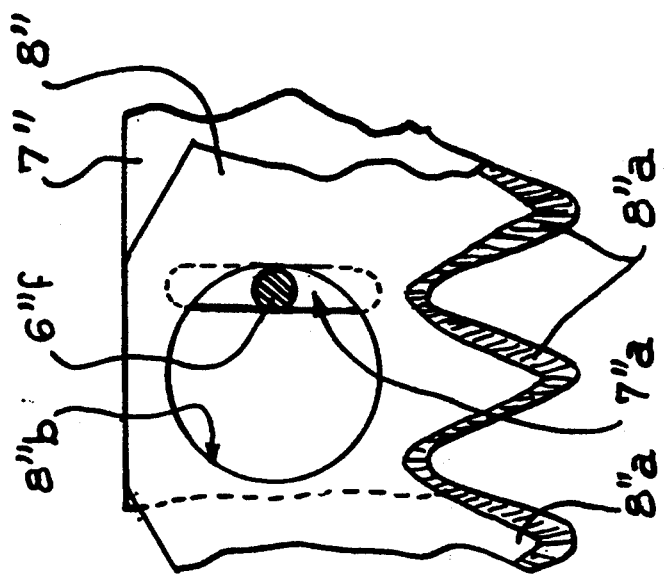
FIGS. 9 to 11 are schematic views along IX—IX (FIG. 8) showing the displacement of the cutting blades with respect to each other in the embodiment of FIG. 8.
Figure 10:
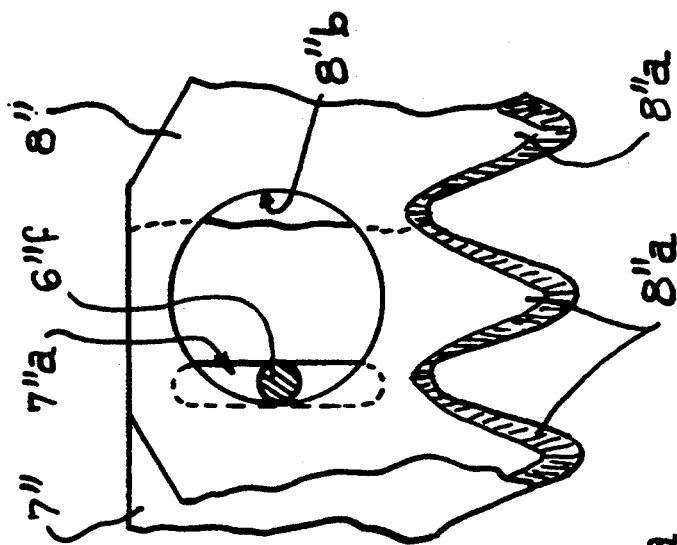

On the contrary, when pin 6"f of cam 6"b lies in the middle of the oblong opening 7"a, it is noted that teeth 7"c and 8"a are one above the other (FIGS. 10, 11).

This variation may include two mobile blades as is previously described in FIG. 4.

It is noted that blades 7, 8 and 7', 8' are inclined by an angle α equal to about 45° with respect to the axis of the hollow handle 2, 2' in order that said blades are always in a plane of cut parallel to that of the ground S.

It is ascertained that the blades 7, 8; 7', 8' and 7", 8" are directed in the direction of raking F in order to pick up debris while cutting the plants.

It is noted that the width of the blades 7, 8; 7', 8' and 7", 8" depends on the width of cut that it is desired for the rake 1, 1' and 1". Likewise, blades 7, 8; 7', 8' and 7", 8" form a plurality of cutting shears which make it possible to cut the grass bordering trees, walls, netting or the like.

The electric motor 3 may be provided with an AC power input or with D.C. current on batteries or rechargeable accumulators.

It must, moreover, be understood that the foregoing description has been given only by way of example and that it in no way limits the domain of the invention which would not be exceeded by replacing the details of execution described by any other equivalents.

I claim:

1. A rake for clearing, mowing, levelling and raking grass and plants comprising, a handle having upper and lower ends, a housing mounted to said lower end of said handle, a drive mechanism mounted within said housing, a motor having a drive shaft connected to said drive mechanism, a first cutting blade having a plurality of forwardly extending teeth which are oriented at an acute angle with respect to said handle so as to define a plane of cut which is generally parallel to a surface to be worked, a second cutting blade having a plurality of forwardly extending teeth, said drive mechanism being connected to at least said first cutting blade, means for mounting said second cutting blade to said housing adjacent to said first cutting blade so that said teeth of said first and second cutting blades form a plurality of parallel shears, shoes mounted so as to extend below said first and second cutting blades to support said first and second cutting blades above the surface to be worked, and collecting means mounted adjacent said first and second cutting blades for temporarily retaining material cut by said plurality of parallel shears.

2. The rake of claim 1 in which said second cutting blade includes finger elements extending therefrom generally parallel to and forwardly of said teeth of said second cutting blade.

3. The rake of claim 2 in which said first cutting blade includes a rearwardly extending flange portion which extends in an oblique angle with respect to said teeth of said first cutting blade, said drive mechanism being engagable with said rearwardly extending flange portion.

4. The rake of claim 3 in which said motor is mounted adjacent to and in spaced relationship with respect to said upper end of said handle, said handle being hollow, and said drive shaft extending within said hollow handle.

5. The rake of claim 1 in which said drive mechanism includes a sleeve which is connected to said drive shaft, said sleeve being rotatably guided inside said housing and being secured to a cam element, and means for driving said first cutting blade by said cam element.

6. The rake of claim 5 in which said first cutting blade has a rearwardly extending flange portion, a slot in said rearwardly extending flange portion, said means for driving including a pin means extending from said cam into said slot of said flange portion.

7. The rake of claim 1 in which said drive mechanism includes a sleeve rotatably mounted within said housing and connected to said drive shaft, means for connecting said sleeve with first and second cams which are cooperatively engaged with said first and second cutting blades, respectively, to thereby reciprocate said first and second cutting blades with respect to one another.

8. The rake of claim 7 in which said first and second cams are discs which are mounted in off-set eccentric relationship with respect to one another by approximately 180° to a pin which is connected to said sleeve.

9. The rake of claim 8 in which each of said first and second cutting blades includes a rearwardly extending portion having an oblong opening therein, a first of said discs being mounted within the oblong opening of said first cutting blade and the other of said discs being mounted within the oblong opening of said second cutting blade whereby said first disc reciprocates said first cutting blade and said second disc reciprocates said second cutting blade.

10. The rake of claim 1 in which said handle is inclined at approximately 45° with respect to said first and second cutting blades.

11. The rake of claim 1 in which said collecting means includes a plate mounted to said housing and extending outwardly at an oblique angle with respect to said first and second cutting blades.

12. The rake of claim 1 including a first rake element mounted to said handle adjacent said lower end thereof, said first rake extending forwardly of said first and second cutting blades.

13. The rake of claim 12 including a second rake element, means for mounting said second rake element to said handle adjacent said lower end thereof, and said second rake element extending rearwardly of said first and second cutting blades.

14. The rake of claim 1 including a rake element mounted above said first and second cutting blades and extending forwardly of the teeth of said first and second cutting blades.

15. A rake for clearing, mowing, levelling and raking grass and plants comprising, a handle having upper and lower ends, a housing mounted to said lower end of said handle, a drive mechanism mounted within said housing, a motor having a drive shaft connected to said drive mechanism, a first cutting blade having a plurality of forwardly extending teeth which are oriented at an acute angle with respect to said handle so as to define a plane of cut which is generally parallel to a surface to be worked, a second cutting blade having a plurality of forwardly extending teeth, said drive mechanism being connected to at least said first cutting blade, means for mounting said second cutting blade to said housing adjacent to said first cutting blade so that said teeth of said first and second cutting blades form a plurality of parallel shears, and shoes mounted so as to extend below said first and second cutting blades to support said first and second cutting blades above the surface to be worked.

16. The rake of claim 15 in which said second cutting blade includes finger elements extending therefrom generally parallel to and forwardly of said teeth of said first and second cutting blades.

17. The rake of claim 15 in which said drive mechanism includes a sleeve which is connected to said drive shaft, said sleeve being rotatably guided inside said housing and being secured to a cam element, said first cutting blade having a rearwardly extending flange portion, a slot in said rearwardly extending flange portion, and pin means extending from said cam into said slot of said flange portion for driving said first cutting blade by said cam element.

18. The rake of claim 15 in which said drive mechanism includes a sleeve rotatably mounted within said housing and connected to said drive shaft, means for connecting said sleeve with first and second cams, said first and second cams being mounted in off-set eccentric relationship with respect to one another by approximately 180° to a pin which is connected to said sleeve, each of said first and second cutting blades including a rearwardly extending portion having an oblong opening therein, said first cam being mounted within the oblong opening of said first cutting blade and said second cam being mounted within the oblong opening of said second cutting blade whereby said first cam reciprocates said first cutting blade and said second cam reciprocates said second cutting blade.

19. The rake of claim 15 including a first rake element mounted to said handle adjacent said lower end thereof, said first rake extending forwardly of said first and second cutting blades.

20. The rake of claim 15 in which said handle is inclined at approximately 45° with respect to said first and second cutting blades.

* * * * *